(12) United States Patent
Bui et al.

(10) Patent No.: US 10,941,794 B2
(45) Date of Patent: Mar. 9, 2021

(54) COMPONENT ARRANGEMENT

(71) Applicant: Bayerische Motoren Werke Aktiengesellschaft, Munich (DE)

(72) Inventors: Hoang Viet Bui, Munich (DE); Rahul Rajagopalan, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 660 days.

(21) Appl. No.: 15/669,315

(22) Filed: Aug. 4, 2017

(65) Prior Publication Data
US 2017/0335869 A1 Nov. 23, 2017

Related U.S. Application Data

(63) Continuation of application No. PCT/EP2016/050758, filed on Jan. 15, 2016.

(30) Foreign Application Priority Data

Feb. 5, 2015 (DE) ...................... 10 2015 202 037.1

(51) Int. Cl.
*F16B 2/00* (2006.01)
*F16B 5/02* (2006.01)
(Continued)

(52) U.S. Cl.
CPC ................ *F16B 2/005* (2013.01); *F16B 5/02* (2013.01); *F16B 5/065* (2013.01); *F16B 21/06* (2013.01); *Y10T 403/75* (2015.01)

(58) Field of Classification Search
CPC .......... F16B 2/005; F16B 5/02; F16B 5/0241; F16B 5/025; F16B 31/04; F16B 33/008;
(Continued)

(56) References Cited

U.S. PATENT DOCUMENTS 2,914,149 A * 11/1959 Walker ...................... F16B 5/02
52/394
2,934,182 A * 4/1960 Neville ...................... F16B 5/02
403/408.1
(Continued)

FOREIGN PATENT DOCUMENTS

CN 101180201 A 5/2008
CN 101268287 A 9/2008
(Continued)

OTHER PUBLICATIONS

"About Fastener Materials." Bolt Depot. Oct. 26, 2013, [online], [retrieved on Jan. 15, 2020] Retrieved from the Internet <URL: https://web.archive.org/web/20131026112945/https://www.boltdepot.com/fastener-information/materials-and-grades/materials.aspx>.*
(Continued)

*Primary Examiner* — Josh Skroupa
(74) *Attorney, Agent, or Firm* — Crowell & Moring LLP

(57) ABSTRACT

An arrangement which has a first component and a second component fastened to each other in a clamping manner. At least the first or second component is a fiber/plastic composite component. The arrangement has a securing element which generates a pressing force that presses the components against each other such that the components are secured to each other in a clamped manner. A friction-coefficient-increasing element is arranged between the first and second components in a pressing region in which the first and second components are pressed against each other by the pressing force. The friction-coefficient-increasing element increases a static friction produced for the pressing force in contrast to a case in which such an element is not arranged in the pressing region. The invention also provides a method for fastening the first component to the second component.

9 Claims, 3 Drawing Sheets

(51) Int. Cl.
*F16B 5/06* (2006.01)
*F16B 21/06* (2006.01)

(58) Field of Classification Search
CPC ............ F16B 2200/50; Y10T 403/335; Y10T 403/645; Y10T 403/75
USPC ..................................... 403/168, 337, 408.1
See application file for complete search history.

(56) References Cited

U.S. PATENT DOCUMENTS

| | | | | |
|---|---|---|---|---|
| 2,936,050 | A * | 5/1960 | McLaughlin | F16B 5/02 52/704 |
| 6,164,684 | A * | 12/2000 | Lehman | B60R 21/217 403/408.1 |
| 6,523,834 | B2 * | 2/2003 | Philipson | C09K 3/1021 277/523 |
| 8,312,606 | B2 * | 11/2012 | Reid | F16B 19/05 411/361 |
| 8,492,004 | B2 * | 7/2013 | Watanabe | F16B 5/02 428/212 |
| 9,291,202 | B2 * | 3/2016 | von Schleinitz | F16B 2/005 |
| 9,604,676 | B2 * | 3/2017 | Kelley | F16B 5/02 |
| 9,689,418 | B2 * | 6/2017 | Schumacher | F16B 33/008 |
| 10,094,405 | B2 * | 10/2018 | Nonaka | B29C 65/562 |
| 2008/0247817 | A1 | 10/2008 | Geislinger et al. | |
| 2010/0000058 | A1 | 1/2010 | De Gelis | |
| 2013/0322804 | A1 | 12/2013 | von Schleinitz | |
| 2014/0064877 | A1 | 3/2014 | Molinier | |
| 2016/0040703 | A1 * | 2/2016 | Schnaufer | F16B 5/02 411/34 |

FOREIGN PATENT DOCUMENTS

| | | | |
|---|---|---|---|
| CN | 101338776 A | | 1/2009 |
| DE | 39 05 688 A1 | | 8/1990 |
| DE | 198 23 928 A1 | | 12/1999 |
| DE | 101 34 809 A1 | | 2/2003 |
| DE | 102010024534 A1 * | 12/2011 | ........... E04B 1/2403 |
| DE | 10 2011 107 237 A1 | | 5/2012 |
| DE | 10 2011 005 921 A1 | | 6/2012 |
| DE | 10 2012 001 859 A1 | | 8/2013 |
| DE | 10 2012 205 882 A1 | | 10/2013 |
| DE | 102012109047 B3 * | 2/2014 | ........... F16B 5/0241 |
| EP | 1 302 685 A1 | | 4/2003 |
| EP | 1 564 418 A1 | | 8/2005 |
| EP | 1 978 264 A2 | | 10/2008 |
| EP | 2 385 260 A1 | | 11/2011 |
| FR | 2 901 853 A1 | | 12/2007 |
| WO | WO 2006/102519 A2 | | 9/2006 |

OTHER PUBLICATIONS

Forensic Polymer Engineering. Gagg, et al. Cambridge, UK, Woodhead Publishing Limited, 2010. p. 301-306. ISBN 978-1-84569-185-1.*
Technical Synopsis of Plasma Surface Treatments. Taylor, Wesley. Gainesville, FL. University of Florida, 2009.*
Translation of DE 102011107237. Hiermer, et al. May 24, 2012. Attachment for fixing plastic component at body component of motor vehicle, has recesses provided in plastic component and in body component, where clamping element is provided with half-open profile.*
German-language European Office Action issued in counterpart European Application No. 16700742.6 dated Nov. 13, 2019 (five (5) pages).
Chinese-language Office Action issued in counterpart Chinese Application No. 201680003364.2 dated Aug. 2, 2019 with English translation (15 pages).
International Search Report (PCT/ISA/210) issued in PCT Application No. PCT/EP2016/050758 dated Mar. 16, 2016 with English translation (five pages).
German-language Written Opinion (PCT/ISA/237) issued in PCT Application No. PCT/EP2016/050758 dated Mar. 16, 2016 (four pages).
German Search Report issued in counterpart German Application No. 10 2015 202 037.1 dated Jan. 21, 2016 with partial English translation (12 pages).
Chinese-language Office Action issued in counterpart Chinese Application No. 201680003364.2 dated Aug. 30, 2018 with English translation (12 pages).

* cited by examiner

COMPONENT ARRANGEMENT

CROSS REFERENCE TO RELATED APPLICATIONS

This application is a continuation of PCT International Application No. PCT/EP2016/050758, filed Jan. 15, 2016, which claims priority under 35 U.S.C. § 119 from German Patent Application No. 10 2015 202 037.1, filed Feb. 5, 2015, the entire disclosures of which are herein expressly incorporated by reference.

BACKGROUND AND SUMMARY OF THE INVENTION

The invention relates to an arrangement having a first and a second component, of which at least one is a fiber plastic composite component (FPC component).

FPC components are generally known in the prior art and are used to an increasing extent in the automotive industry in order to realize lightweight constructions.

If it is provided during the assembly that such FPC components are fitted by a screw connection, measures are necessary in order to ensure a permanently reliable screw connection. The reason for this is that the fiber plastic composite has severe creep behavior which may cause the screw connection to lose its prestressing force—what is referred to as settling.

So that such creep behavior of the fiber plastic composite does not lead to any detaching or loosening of the screw connection, in the prior art, metal bushings, for example, for the passage of the corresponding screw are adhesively bonded into the FPC component at points intended for the assembly.

The principle of such a metal bushing being adhesively bonded in is that the prestressing force of the screw connection acts on the metal bushing and the transmission of force to the FPC component is carried out by adhesively fastening the bushing.

However, the use and adhesive bonding of the explained metal bushing leads to an undesirable additional weight of the FPC component and to an increase in the necessary production or assembly steps. For example, prior to the adhesive bonding of the metal bushing, the surface of the FPC component has to be cleaned, then the adhesive applied and a delay occurs until it has hardened.

Furthermore, in the event of a defective adhesive connection, losses of rigidity may occur which lead to stability problems.

It is thus the object of the present invention to provide an arrangement of securely clamped components, of which at least one is an FPC component, which ensures a secure clamping connection.

This and other objects are achieved by an arrangement according to embodiments of the invention.

According to one aspect of the invention, the arrangement comprises a first component and a second component, wherein at least the first or second component is a fiber plastic composite component.

The arrangement also comprises a fastener which generates a pressing force pressing the components against each other in such a manner that the components are fastened to each other in a clamping manner (with a force fit).

A friction-coefficient-increasing element is arranged between the first and second components in a pressing region in which the first component and the second component are pressed against each other by the pressing force.

The friction-coefficient-increasing element increases a static friction arising for the pressing force in comparison to a case in which such a friction-coefficient-increasing element is not arranged in the pressing region.

In other words, the (static) coefficient of friction which arises for the pairing of the materials of the first component and of the second component is increased by the provision or arrangement of the friction-coefficient-increasing element in such a manner that the static friction arising for the pressing force is increased.

The pressing force is dimensioned depending on the intended loading of the arrangement or depending on the shearing and thrust forces acting as intended.

The arrangement according to the invention of the friction-coefficient-increasing element advantageously results in greater freedom in the dimensioning and configuration of the fastener and/or of the pressing force. For example, for a certain application, the fastener and/or the pressing force or prestress generated by the fastener may be dimensioned to be smaller or lower because the static friction is increased by the friction-coefficient-increasing element. This increases, for example, the lightweight construction potential. On the other hand, an increased static friction can be obtained, for example, for a predetermined fastener and/or pressing force.

All in all, by means of the arrangement according to the invention, in particular by the arranging of the friction-coefficient-increasing element, detaching of the fastener can be prevented even in the event of creep behavior of fiber plastic composite component and an associated settling of the clamping fastening of the two components.

In addition, the assembly of the FPC component can be carried out in a simple manner in a few easily controllable steps.

The arrangement according to the invention is in particular an arrangement of two corresponding components arranged in/on a motor vehicle or on a motorcycle.

The arrangement according to the invention is used in particular in motor vehicles for the fastening of a carbon fiber reinforced plastic shear area on an aluminum axle support.

The fiber plastic composite component is formed in particular by a reinforcing fiber being embedded in a plastics matrix. The plastics matrix material forming the matrix of the FPC component can be, for example, a thermosetting plastic or else a thermoplastic.

Depending on the intended use of the FPC component, various types of reinforcing fibers can be used, for example inorganic reinforcing fibers (basalt fibers, boron fibers, glass fibers, ceramic fibers and silica fibers), metallic reinforcing fibers (steel fibers, aluminum fibers, copper fibers, metal and metal alloy fibers in general), organic reinforcing fibers (aramid fibers, carbon fibers, polyester fibers, nylon fibers, polyethylene fibers and plexiglass fibers) and natural fibers (wood fibers and flat fibers).

The embedded reinforcing fibers can be present in various lengths in the FPC component, as a result of which different rigidity and strength properties can be obtained. When continuous fibers are used, i.e., reinforcing fibers which run completely through the FPC component, the greatest rigidity and strength values are achieved.

The aforementioned reinforcing fibers can have various structures within the component. For example, the continuous fibers can be woven to form wovens or can be present in the form of nonwovens in which the continuous fibers are arranged in parallel. Other types of reinforcing fiber structures are, for example, knitted fabrics, braided fabrics, mats and fleeces.

The FPC component is particularly preferably a carbon fiber composite component (CFC component).

The friction-coefficient-increasing element is configured in particular in such a manner that it increases for a material pairing (for example aluminum and fiber plastic composite, or fiber plastic composite/fiber plastic composite) by 5 to 6 times.

In a preferred refinement, the friction-coefficient-increasing element is a coating which is applied to one of the components. Such a coating is produced in an entirely preferred manner by a plasma coating.

As an alternative, the friction-coefficient-increasing element can be a roughened disk or a piece with a roughened surface severed from a sheet of material. In particular, hard particles which ensure the increase in the coefficient of friction are secured on the disk or on the sheet.

The friction-coefficient-increasing element preferably contains hard particles, preferably silicon carbide particles and/or quartz particles and/or corundum ($Al_2O_3$) particles and/or emery particles and/or pumice stone particles and/or garnet particles and/or diamond particles (natural diamond and/or synthetically produced diamond).

The hard particles are preferably applied to the first and/or second component by an adhesive agent. The adhesive agent is, for example, a paste and/or an adhesive and/or a synthetic resin. For example, the adhesive agent is a Ni adhesive agent.

The fiber plastic composite component preferably has an anti-corrosion layer, for example a glass fiber layer, on a surface facing the other component and/or on a surface facing away from the other component.

The arrangement of the anti-corrosion layer is of advantage in particular whenever the fastening element or one of the components is manufactured from a metal. If the fastening element is manufactured by metal and one of the components is a metal component, it is preferred that the fiber plastic composite component has an anti-corrosion layer in the form of, for example, a glass fiber layer on the surface facing and the surface facing away from the other component. In this case, the friction-coefficient-increasing element is arranged on the anti-corrosion layer on the surface facing the other component.

In other words, the region in which the anti-corrosion layer is arranged on the surface facing the other component forms the pressing region.

If the first and the second components are a fiber plastic composite component and the fastener is formed from a metal, a respective anti-corrosion layer is preferably arranged on those surfaces of the fiber plastic composite components which face away from the other component in each case. The fastener formed from a metal lies against the anti-corrosion layers which are arranged on the surfaces facing away from the other component in each case, in order to form the clamping connection or the pressing force.

The first and the second component are particularly preferably a fiber plastic composite component, and the first and second components have an anti-corrosion layer, for example a glass fiber layer, on the surface facing the other component and the surface facing away from the other component.

In the arrangement according to the invention, the fastener is preferably formed from a metal and lies against the anti-corrosion layer on the fiber plastic composite component(s).

In particular in the case in which the FPC component is a carbon fiber plastic composite component (CFP component), corrosion of a fastener formed from a metal and/or of a component formed from a metal is prevented by the anti-corrosion layers which have been explained because the carbon fibers and the metal are prevented from coming into contact with an electrolyte, such as, for example, salty water.

The fastening element referred to and explained above may be, for example, a screw which, after passing through the first and second components, is provided with a nut on the side facing away from a screw head and is screwed into an extended threaded holder to permit screwing over a longer length, or into a rivet nut.

A further aspect of the invention relates to a method for fastening a first component to a second component, wherein at least the first or second component is a fiber plastic composite component.

The method has in particular a preparing step in which a friction-coefficient-increasing element is applied to the fiber plastic composite component or to the other component, and The method also has a fastening step in which the components are connected in a clamping manner (with a force fit) such that the friction-coefficient-increasing element is arranged between the fiber plastic composite component and the other component in a pressing region in which the first component and the second component are pressed against each other. The friction-coefficient-increasing element acts in such a manner that a static friction arising for the components connected in a clamping manner is increased in comparison to a case in which such an element is not arranged in the pressing region.

The above explanations with regard to the first and second components, the fastener and the friction-coefficient-increasing element apply equally to the method according to the invention.

In the preparing step, the friction-coefficient-increasing element is preferably applied to the first or the second component by plasma coating. In this connection, for example, the hard particles mentioned above, in particular silicon carbide particles, are injected in a plasma jet into a process chamber of a plasma coating device and thus strike against the component to be coated.

Preferred variants of an arrangement according to the invention of a first and second component and a corresponding fastening method for fastening the first or second component to the respective other component are explained below with reference to the attached figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
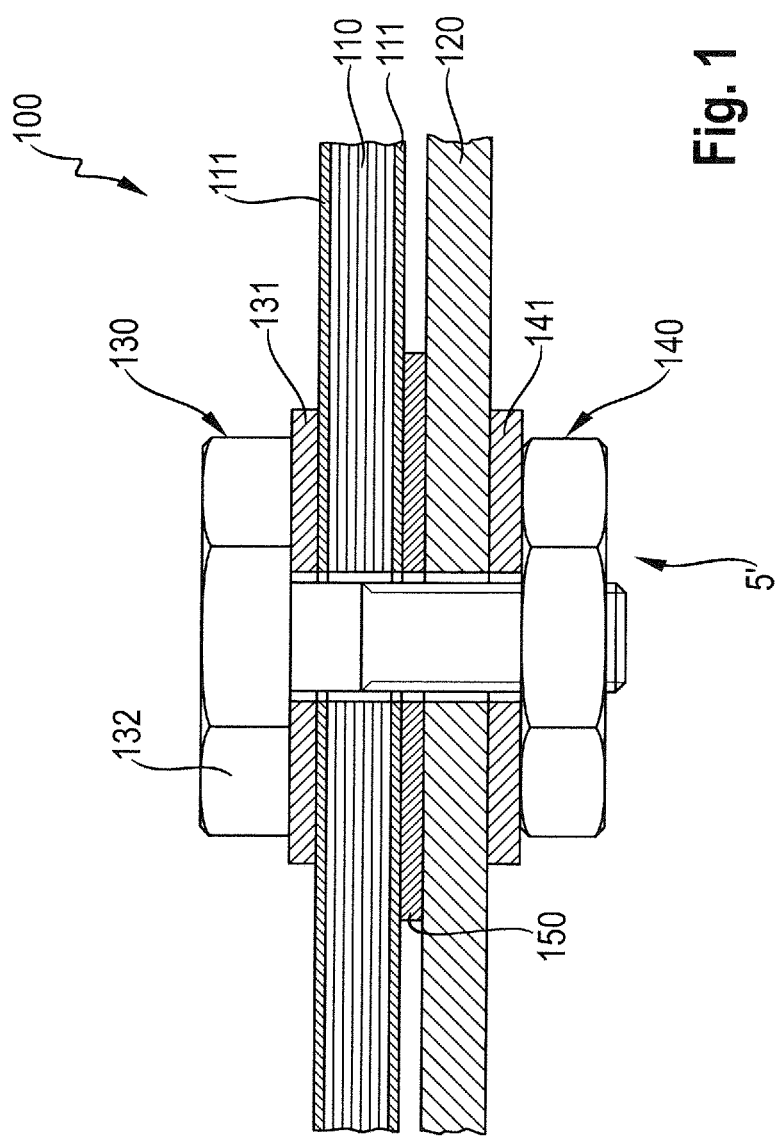
FIG. 1 is a view of a first variant of an arrangement according to the invention, wherein a fastener provided for the clamping fastening of the two components is formed from a screw provided with a nut.

FIG. 1 shows a first variant of an arrangement 100 according to the invention.

The arrangement 100 according to the invention has a first component 110 and a second component 120 which are fastened to each other in a clamping manner (with a force fit) via a fastening element 130.

The components 110, 120 are preferably components of a motor vehicle or motorcycle. For example, the first component 110 and the second component 120 are shell elements in a floor region of a motor vehicle.

The arrangement 100 according to the invention is in particular also an arrangement which is subjected to a shearing stress when loaded as intended. That is to say, shearing forces, i.e., forces parallel to the surfaces of the components 110, 120, act on the arrangement 100 according to the invention.

In this first variant of the arrangement 100 according to the invention, the first component 110 is a fiber plastic composite component (FPC component). Depending on the intended loading of the arrangement 100 according to the invention, various reinforcing fibers in terms of type and form, for example carbon fibers in the form of mats and wovens, can be used in the FPC component 110. The reinforcing fibers of the FPC component 110 are embedded in a matrix material which can be, for example, a thermosetting plastic or a thermoplastic.

The FPC component 110 is preferably to this extent a CFP component.

The FPC component 110 bears a respective anti-corrosion layer 111, which can be formed, for example, from a glass fiber layer, on a surface facing the second component 120 and on a surface facing away from the second component 120.

In this first variant of the arrangement 100 according to the invention, the second component 120 is an aluminum component.

The fastener 130 is preferably formed, as illustrated, from a screw which is guided through a respective passage in the first component 110 and the second component 120.

The screw 130 lies with its screw head 132 via a plain washer 131 against the FPC component 110. The plain washer 131 is preferably provided for the definition of a restricted surface pressure.

The screw 130 is provided on a side facing away from the screw head 132, i.e. on the side of the second component 120, with a nut 140. The nut 140 lies via a further plain washer 141 against the second component 120.

In general, the arrangement 100 may also be designed in such a manner that the arrangement of the screw head 132 and the nut 140 are interchanged, i.e., the screw head 132 lies via the corresponding plain washer 131 against the second component 120, and the nut 140 in turn lies via the corresponding plain washer 141 against the first component 110.

The nut 140 is fastened to the screw 130 via an adhesive as a sealing measure so that no moisture can enter the passages in the component. The adhesive also acts as a screw securing measure.

The adhesive may be a micro-encapsulated adhesive.

According to the invention, a friction-coefficient-increasing element 150 is arranged between the first component 110 and the second component 120. The friction-coefficient-increasing element 150 has such an effect that, for the material pairing of fiber plastic composite/aluminum, a (static) coefficient of friction arises which is increased in comparison to the case in which the friction-coefficient-increasing element 150 is not present. This means that, by use of the friction-coefficient-increasing element 150, the static friction or adhesion which opposes the acting shearing forces and arises from the prestressing force or the pressing force of the screw 130 and the coefficient of friction is greater than without the provision of the friction-coefficient-increasing element 150.

The friction-coefficient-increasing element 150 can be, for example, hard particles which have been applied to the pressing region by a paste or a synthetic resin.

Very particularly preferably, the friction-coefficient-increasing element 150 can be a surface coating, produced via a plasma coating, either of the first component 110 or of the second component 120.

Furthermore preferably, the friction-coefficient-increasing element 150 can be a roughened disk or a piece of a roughened sheet. Preferred materials for the hard particles are, for example, silicon carbide hard particles or diamond particles.

The increased static friction gives rise, according to the invention, to the possibility either of fastening components by smaller fastener or screws 130 because a higher static friction is already achieved with a lower prestressing force or pressing force, or of achieving an increased static friction for certain fasteners.

Figure 2:
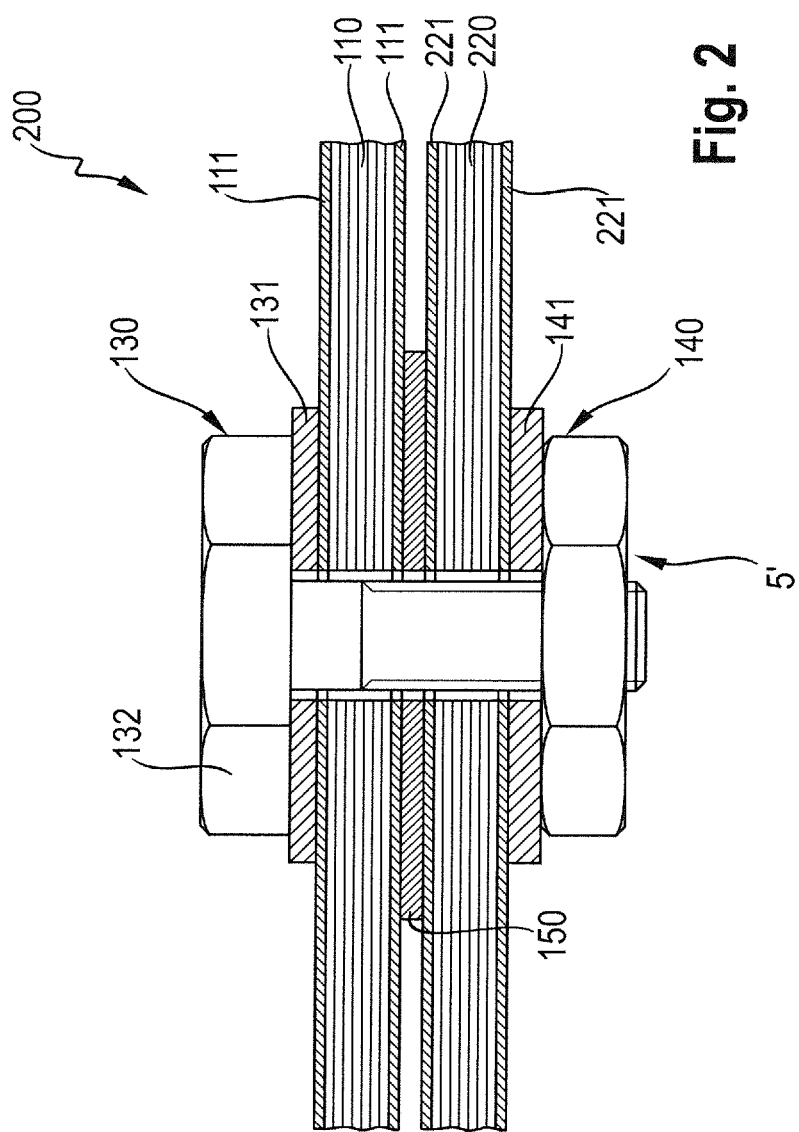
FIG. 2 is a view of a further variant of an arrangement according to the invention which is identical to the arrangement shown in FIG. 1 except for the difference that the two components are realized by a fiber plastic composite component.

A second variant 200 of the arrangement according to the invention is explained with reference to FIG. 2. Elements of this arrangement 200 that are identical to those of the first variant bear the identical reference signs and are not explained once again. As is apparent from FIG. 2, the difference over the arrangement 100 of FIG. 1 consists in that the second component 220 is also an FPC component. The second component 220 is preferably, like the first component 110, also a carbon fiber plastic composite component (CFP component).

The second component 220, like the first component 110, bears an anti-corrosion layer 221 both on a surface facing the first component 110 and on a surface facing away from the first component. The anti-corrosion layer 221 is preferably a glass fiber layer.

Figure 3:
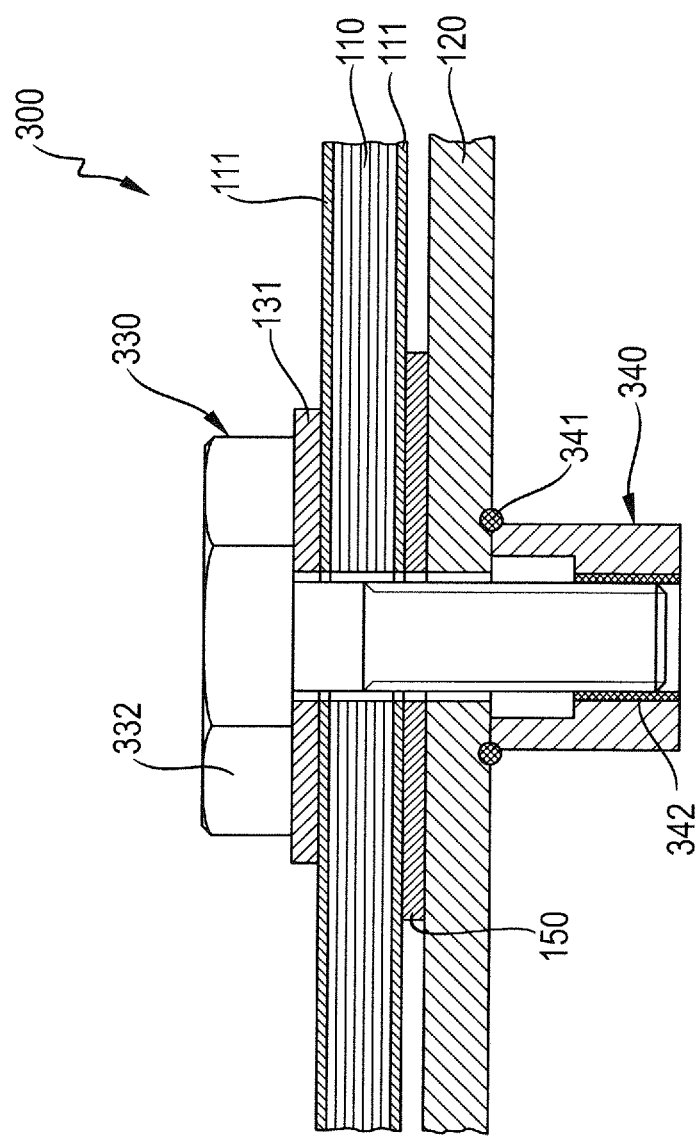
FIG. 3 is a view of a further variant of the arrangement according to the invention, wherein, in this variant, a screw which is extended in relation to FIGS. 1 and 2 and is screwed into a threaded holder is used as the fastener.

FIG. 3 shows a third variant 300 of the arrangement according to the invention, wherein this arrangement 300 is identical to the arrangement 100 of FIG. 1 except for the difference that the plain washer 141 and the nut 140 shown in FIG. 1 are replaced by a threaded holder 340 and the screw 330 is longer.

The threaded holder 340 enables the screw length to be freely adapted to the arrangement 300 or the components 110, 120. That is to say, a longer screw 330 can be used for the fastening of the components 110, 120, which leads to the settling behavior of the screw connection being further reduced. The threaded holder 340 is preferably fastened to the aluminum component or in general to the metal component 120 at points 341 by an integrally bonded connection, such as, for example, a welded joint.

Alternatively to the threaded holder 340, a rivet nut (not illustrated) fastened to the second component 120 can also be used.

To secure and seal the screw connection, a micro-encapsulated adhesive 342 can be provided again between the thread of the threaded holder 340 and the screw thread of the screw 330.

Alternatively, the threaded holder 340 can be configured in such a manner that it forms a blind hole in which the thread for the screw 330 is provided.

In particular, the use of the friction-coefficient-increasing element 150 leads to an increased (static) coefficient of friction arising for the material pairing of the first and second components 110, 120. Furthermore, in particular the threaded holder of the third variant of the arrangement according to the invention leads to a longer screw which has greater elasticity and therefore consequently to a reduction in the settling behavior of the screw connection.

In particular, the friction-coefficient-increasing element 150 also in combination with the threaded holder 340 leads to detaching of the screw connection being prevented.

The arrangement according to the invention is used in particular in motor vehicles for the connection of a CFP shear area and an aluminum axle support.

The invention likewise relates to a method for fastening the first component to the second component.

The method according to the invention in particular includes a preparing step in which the friction-coefficient-increasing element 150 is applied to the first and/or the second component, and a fastening step following the preparing step, in which the components are fastened to each other in a clamping manner, specifically by use of the fastener explained above.

If the fastener is designed in the form of the screws which have been explained, the corresponding passage in the first and second components is formed before or after the preparing step.

In a particularly preferred embodiment, the friction-coefficients-increasing element 150 is produced on the components by plasma coating.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement, comprising:
   a first component and a second component, wherein at least the first or second component is a fiber plastic composite component;
   a fastener which generates a pressing force pressing the components against each other in such a manner that the components are fastened to each other in a clamping manner; and
   a threaded holder, wherein
   the fastener is a screw that has a head disposed on a side of the first and second components and a portion that passes through respective passages in the first and second components and wherein an end of the portion is received within the threaded holder,
   an adhesive is disposed between the end of the portion of the screw and the threaded holder,
   a friction-coefficient-increasing element is arranged between the first and second components in a pressing region in which the first component and the second component are pressed against each other by the pressing force,
   the friction-coefficient-increasing element increases a static friction arising for the pressing force in comparison to a case in which the friction-coefficient-increasing element is not arranged in the pressing region, and
   wherein the friction-coefficient-increasing element is a roughened disk or a sheet of material with a roughened surface and wherein particles are secured on the roughened disk or the roughened surface of the sheet of material.

2. The arrangement according to claim 1, wherein the particles are silicon carbide particles and/or quartz particles and/or corundum (Al2O3) particles and/or emery particles and/or pumice stone particles and/or garnet particles and/or diamond particles.

3. The arrangement according to claim 1, wherein the fiber plastic composite component has an anti-corrosion layer on a surface facing the other component and/or on a surface facing away from the other component.

4. The arrangement according to claim 3, wherein the anti-corrosion layer is a glass fiber layer.

5. The arrangement according to claim 4, wherein
   the first and second components are fiber plastic composite components, and
   the first and second components have an anti-corrosion layer on the surface facing the other component and on the surface facing away from the other component.

6. The arrangement according to claim 5, wherein the anti-corrosion layer is a glass fiber layer.

7. The arrangement according to claim 6, wherein the fastener is formed from a metal and lies against the anti-corrosion layer on the fiber plastic composite component.

8. The arrangement according to claim 3, wherein the fastener is formed from a metal and lies against the anti-corrosion layer on the fiber plastic composite component.

9. A method for fastening a first component to a second component, wherein at least the first or second component is a fiber plastic composite component, the method comprising the steps of:
   applying a friction-coefficient-increasing element to the fiber plastic composite component or to the other component; and
   fastening the components in a clamping manner by a screw and a threaded holder, wherein a head of the screw is disposed on a side of the first and second components and a portion of the screw passes through respective passages in the first and second components, wherein an end of the portion is received within the threaded holder and an adhesive is disposed between the end of the portion and the threaded holder, such that the friction-coefficient-increasing element is arranged between the components in a pressing region in which the components are pressed against each other, wherein the friction-coefficient-increasing element acts in such a manner that a static friction arising for the components connected in the clamping manner is increased in comparison to a case in which the friction-coefficient-increasing element is not arranged in the pressing region, and
   wherein the friction-coefficient-increasing element is a roughened disk or a sheet of material with a roughened surface and wherein particles are secured on the roughened disk or the roughened surface of the sheet of material.

* * * * *